Oct. 21, 1969 G. R. HEARN ET AL 3,474,232

DATA PROCESSING DEVICE AND METHOD

Filed June 30, 1965 4 Sheets-Sheet 1

INVENTORS
GLENN R. HEARN
JAMES A. ROLLINS
FRANK H. SCHALLER
BY John J. McCormack
ATTORNEY Oct. 21, 1969 G. R. HEARN ET AL 3,474,232

DATA PROCESSING DEVICE AND METHOD

Filed June 30, 1965 4 Sheets-Sheet 3

Oct. 21, 1969 G. R. HEARN ET AL 3,474,232

DATA PROCESSING DEVICE AND METHOD

Filed June 30, 1965 4 Sheets-Sheet 4

United States Patent Office 3,474,232

Patented Oct. 21, 1969

3,474,232
DATA PROCESSING DEVICE AND METHOD

Glenn R. Hearn, Burlington, James A. Rollins, Lexington, and Frank H. Schaller, Needham, Mass., assignors to Honeywell Inc., Minneapolis, Minn., a corporation of Delaware Filed June 30, 1965, Ser. No. 468,293
Int. Cl. G06k *7/00;* G01n *21/30*
U.S. Cl. 235—61.11 13 Claims

ABSTRACT OF THE DISCLOSURE

A system for tracking the advance of cards relative to a processing station and producing a strobe signal for controlling the station. The strobe signal is produced in response to the output of a timing ladder of photo-voltaic detector cells arranged along the card path beneath a light source to be sequentially energized upon passage of the trailing edge of a card. A second timing ladder of photo-voltaic gate cells is provided along the card path, whereby the trailing edge of a card always traverses a gate cell immediately before it traverses any of an associated group of detector cells. Thus, each gate cell is arranged to enable its associated group of detector cells immediately prior to passage of the trailing edge of the card whereby the system discriminates against tears and other non-informational marks in the card. The gate cells may be selectively controlled whereby the system is responsive to cards of different length. A third timing ladder of detector cells may be provided along the card path to permit selective derivatives of a strobe signal from either side of the trailing edge of a card.

The present invention relates to record sensing stations for electronic data processing apparatus, and more particularly, is concerned with strobe means associated with record interpreting portions of such stations, whereby elements of a data processing station may be controlled in accordance with sequential movements of a record as it is translated relative to the station.

In many data processing systems, the data input assumes the form of an information-bearing record on which encoded information is serially recorded, for instance, in columns of "marks" on a unit record, such as hole-columns on a punched card. Often such "marks," or informational bits, comprise photo-detectable areas, such as holes punched through a card. The present invention relates to means for correlating the location of such informational bits with the operation of a data handling station as the record medium is moved relative to the station. For instance, the invention can control a card-reading station relative to punched hole-column locations as the card is translated across the station. Thus, the invention provides a strobing, i.e. tracking or position-referencing, of informational zones on a moving record relative to a processing station. Workers in the art have long devoted considerable effort to developing suitable strobing systems. For instance, card-strobing means have been suggested which use reference marks especially impressed upon a record adjacent each "informational zone" thereof, such as the fluorescent record marks shown in U.S. Patent 3,052,405 to Woodland; these marks indicating character-column locations. Alternatively, workers have suggested using the sprocket hole of a record (e.g. punched tape) as a convenient indicator of record position, for instance, as noted in U.S. Patent 3,153,721 to Kaminsky et al. Another method for continuously indicating record position (i.e. strobing) involves referencing from the leading edge of a punched card as noted in the above Kaminsky Patent and also in U.S. 2,831,634 to Luhn. Such edge-detection strobing is advantageously asynchronous, that is, it operates independently of record-translation speeds. The above methods suffer from serious drawbacks, however. Some such drawbacks are specifically noted in the Kaminsky Patent referred to. The present invention involves a novel strobing means which, unlike the prior art, may employ the trailing edge of a record as a reference indicator.

A major disadvantage of "leading-edge" strobing is that, unlike the trailing-edge strobing according to the invention, it uses a variable reference. For instance, it has been found that the columns of different punched cards are regularly spaced a constant distance from the trailing edges of the cards but often irregularly spaced from the leading edges. Consequently, systems which strobe from the leading edge are much more apt to "mislocate" card columns and produce reading errors. Further, trailing-edge strobing allows a more efficient utilization of intra-machine space. For example, card-punching and card-reading stations are commonly preceded by a "wait-station" where cards are aligned. Strobbing from a trailing card edge can be done at this wait-station, whereas "leading-edge strobing" requires added space downstream of the processing station, space that is otherwise unnecessary. The invention saves this space, using the wait-station area for strobing as well. Thus, it is an object of the invention to provide a record strobing system which may correlate the passage of a trailing record edge with the location of informational indicia thereon.

The prior art has suggested that such "leading-edge strobing" may be accomplished using an array of photo-detectors, which are aligned to be sequentially extinguished by the super-position of the leading edge of a punched card as it passes over each detector in the array. However, this system has serious disadvantages not found in the "trailing-edge strobing" of the invention. For instance, it quickly "disables" the stroke sensing means by necessarily masking out the photo-sensors, thereby rendering them otherwise useless for the greater portion of card-transit time. By contrast, the "trailing-edge" detection system of the invention allows keeping the strobe photo-sensor means active during record super-position and may perform other functions in addition to strobing, such as indicating jams, record scoring, record misaligment and the like. Thus, unlike the leading-edge detection system taught in the aforementioned Luhn Patent, the stroke station according to the invention can also function as a "wait" station and cooperate in providing alignment and jam detection, upstream of the card-processing station; a more effective position for such detection than downstream of this station is necessary with leading-edge detectors. Portions of the subject strobe detector assembly can perform this function simultaneously while the rest of the assembly is "strobing"—another gain in machine efficiency.

The invention also provides a more "fail-safe" strobe indication in that, unlike prior art systems, its detectors are "turned-on" rather than "off." Thus, the failure of a sub-component, such as a stroke amplifier, cannot be misinterpreted as strobe information. Nor can dust particles or the like falsely indicate card presence by covering strobe-detectors. By comparison, a dust particle on prior art strobe surfaces, such as that of the above-mentioned Luhn Patent, can "mask out" a detector and thereby erroneously indicate the presence of the card. Such commonly occurring particles can be pushed over the entire strobe-detector array of Luhn by passing cards to thereby prematurely trip all eighty of his "column detector" units—an intolerable error, which would not be induced with the invention. Hence, an object of the invention is to provide a strobing system which is fail-safe in that it energizes strobe sensors, rather than de-energizing them during detection. Still another object is to provide a strobe ladder arrangement for detecting movements of the trailing edge of a punched card as a strobe reference and thereby strobing more accurately and reliably.

Another major drawback with prior art strobe systems is that "non-informational" record conditions, such as a score, a tear or a mispunched (offset) hole in a punched card can cause a false read-out. Cards are commonly scored to provide detachable portions. For instance, a light transmitting score in the vicinity of the last column of a card could readily upset the strobe arrangement of the above-mentioned Luhn Patent by erroneously and prematurely indicating an inter-card gap and thereby generating a false "begin-to-read" signal. Other prior art strobe systems can be similarly misread, whereas the arrangement according to the invention can discriminate these "non-informational" conditions from true strobe-information. One embodiment of the invention accomplishes this discrimination using a novel arrangement of gating detectors for gating the strobe-detectors only when the reference (trailing) card-edge is approaching them. In one embodiment, such a gating detector comprises a gating photo-detector means arranged to be insensitive to card-perforations and thereby "enable" an associated array of strobe-detectors only after it has detected passage of the trailing card edge. Thus, another object of the invention is to provide a record strobing system, wherein gating-detector means are associated with strobe-detector means to prevent the latter from being falsely energized by non-informational indicia or conditions on the record. A further object is to provide such a strobing system using a linear array of strobe detectors and associated gating detector means. Yet another object is to provide such a linear strobe array in operative combination with gating detectors which are provided to discriminate between a record edge and perforations therein.

The present invention, in addition to exhibiting the above "fail-safe" and "perforation-discrimination" characteristics associated with the features, respectively, of trailing-edge detection and strobe-detector gating is also designed to improve strobing accuracy. This latter feature is accomplished according to the invention by allowing the selection of various segments of a "reference-segment" portion of a record for use as a strobing reference. More particularly, the "reference-segment" may comprise the trailing-edge of a punched card. In such a case, a feature of the invention is that it allows the selection of different portions of this "trailing-edge segment" as a reference indicator, according to which segment portions are best suited for strobe detection (e.g. clean-cut edges along certain areas). To accomplish this, the invention contemplates the use of multiple "strobe-ladders," i.e. plural linear arrays of strobe-detectors, so that if one portion of a trailing card edge is rough and unsuitable for strobing, another more sharply defined edge-segment may be chosen and only the corresponding strobe-detector array enabled. Detector array selection may be effected by shutter means, or the like, conveniently.

The foregoing objects and novel features of the invention are provided in a preferred embodiment of the invention. This embodiment includes a processing station for reading punched card records, transport means for moving the records through the station and a strobe station located adjacent this read-station and upstream thereof, together with a lamp to illuminate the strobe station. As punched cards are moved across this strobe station en route to the read-station, they pass over several linear arrays of photo-detector elements, each element being arranged to generate a "read-sampling" (i.e., strobe) signal indicative of a different prescribed card column. This signal indicates that a prescribed card-column is moving across the read-head, since each detector is located in prescribed relation to that read-head and is energized by the lamp illumination as the record edge uncovers it. These detector arrays are each aligned to fall between different rows of data on the record and thus cannot be triggered by informational holes punched along the rows. However, the detectors can be tripped by inter-row "strobe-noise," such as scores, accidental card perforations, mispunches, tears, etc. Thus, to prevent such accidental strobe signals, one embodiment provides a separate array of gating detectors to "enable" the strobe-detectors only when the trailing card edge comes adjacent them. Each linear strobe array may be aligned along different edge-segments (between different information-rows) to be selectable according to which segment an operator desires to strobe from.

The foregoing and other characteristic objects and features of novelty, are pointed out with particularity in the claims annexed hereto and form a part of the present specification. For a better understanding of the invention, its advantages and specific objects attained with its use, reference should be had to the accompanying drawings and descriptive matter in which there is illustrated and described a preferred embodiment of the invention.

Referring to the drawings.

Figure 1:
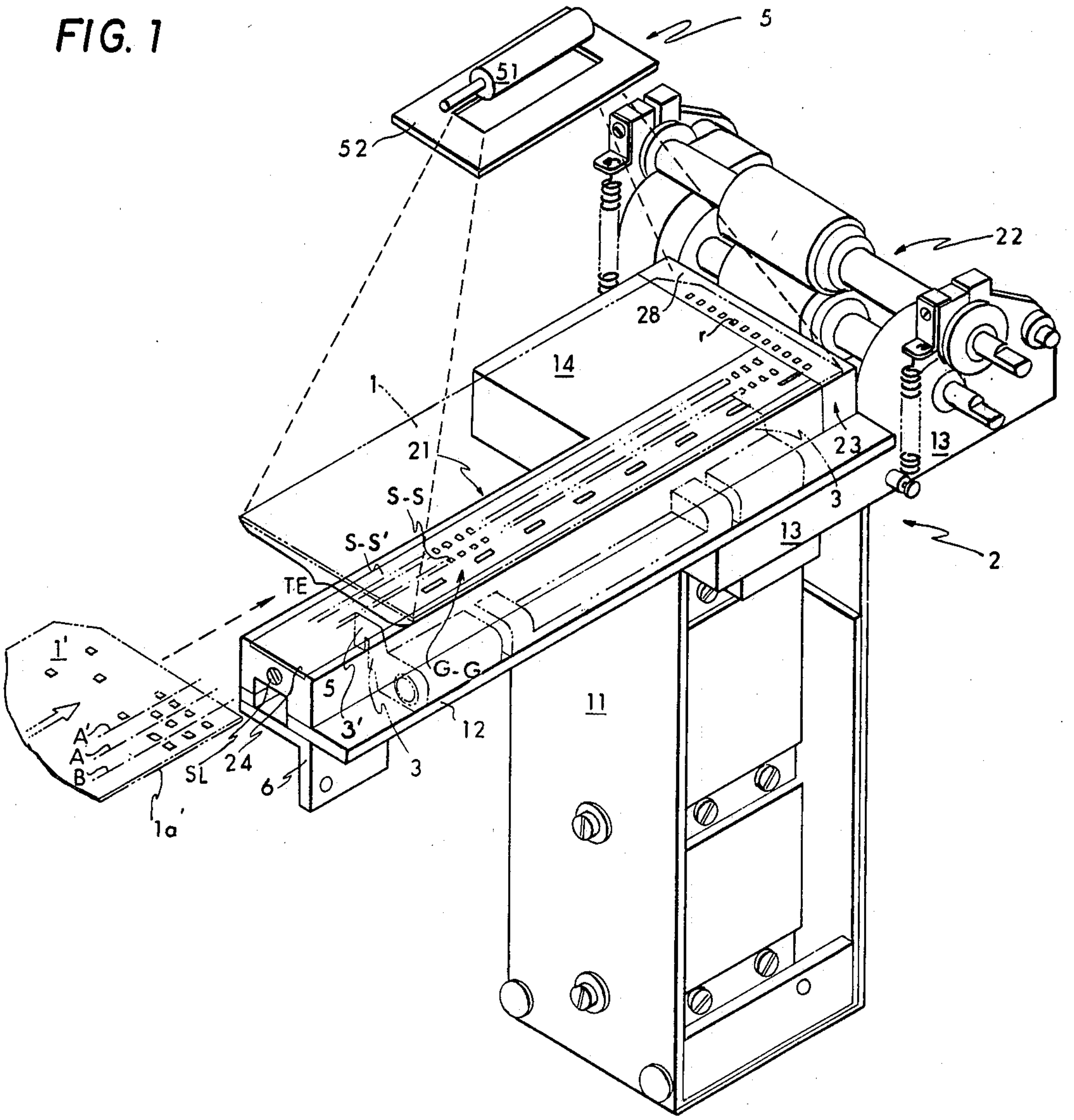
FIGURE 1 shows a perspective view of a preferred embodiment of the invention as employed for use in the sensing of data from punched cards.

Referring in detail to the figures, FIGURE 1 shows a preferred embodiment of the invention in the form of a punched card strobing system employed in connection with card-reading apparatus. Functionally, this embodiment represents an arrangement for advancing record media, namely punched cards 1, 1' past a record processing station, namely a read-head 23 which is adapted to "read" data marks, i.e. holes 1*a*, etc., by photoelectrically sensing the existence of translucent apertures, in records 1, 1'. Transport means, namely a drive roller assembly 22, is provided to advance records 1, 1' across a strobe station portion 21 of a unitary card processing mounting 2 which also supports transport assembly 22 and read-head 23 in prescribed fixed alignment. According to the invention, strobe station 21 is located in prescribed relation to read head 23 and is adapted to "enable" (gate) head 23 at times when successive hole-columns pass over head 23. Strobe 21 tracks the trailing edge of cards to thereby detect this edge at reference positions corresponding to the registration of different hole-columns on head 23. Accordingly, in this embodiment, strobe station 21 takes the form of two arrays of strobe sensing units, i.e. "strobe ladders" S—S, S—S', each being aligned along a strobe axis A, A' respectively, which is parallel to the path of card advance. In this embodiment, a second type of linear detector array, i.e. a gating ladder G—G is also provided, being adapted to cooperate with the strobing arrays S—S, S—S' by "gating" (or enabling) prescribed portions thereof when it senses the passage of a trailing card edge, TE as particularized below. The sensing units of gating ladder G—G are aligned along a gate axis B1 parallel to axes A, A'. The strobing and gating ladders each may comprise rows of slits, or windows, through an opaque mask 24 and associated photoelectric detector means. See slits $S_1$, $S_3$ etc. in FIGURE 2.

A guide rail 3 is pivotably mounted on unit 2 adjacent mask 24 to maintain cards (1, 1') in fixed lateral alignment as they are advanced across strobe assembly 21 toward roller assembly 22. Rail 3 thus provides an edge-guide for the bottom, or "9" edges of card 1 as shown (rail 3 and card in phantom). This helps to maintain cards aligned parallel to detector axes A, A', B, thereby assuring that the detectors will align between rows of punched holes, as indicated relative to card 1'. Rail 3 includes a resilient guide portion (not shown) to damp out card thrusts normal to axes A, A', B and also has a "Pinch" portion 3' overhanging the card edge to press cards down upon mask 24, thus reducing card-wrap and "card-fly" during transit across the mask. For a source of suitable illumination, lamp assembly 5 is provided to illuminate the strobe mask 24 with relatively normal incident light. As will become more apparent below, the strobe ladders S—S, S—S' comprise eighty slits each ($S_1$ etc., and $S_1'$ etc.) which function to successively sense the advancement of the trailing edge, TE, of punched cards 1, 1' etc. when prescribed card-columns are in position over the read slits *r* of read-station 23. Thus, each of the eighty strobe slits in ladders S—S and S—S' (i.e. $S_1$–$S_{80}$ and $S_{1'}$–$S_{80'}$) are located in prescribed relation to the read slits *r* in read-station 23 so as to enable their associated photosensors to indicate different columns of punched holes (particularized below). This spaced relation is referenced to perscribed varying distances from the reference trailing edge TE of the cards. It will be apparent that, since strobe ladders S—S, S—S' must not be energized by the informational data-holes in the punched cards, they therefore must be located so that when a card is aligned along rail 3, the slits will fall between data rows on the cards, for instance, along inter-row axes A and A', respectively. Other inter-row axes may be used, of course, according to the spacing of slit ladders S—S, S—S' from rail 3.

As will become more apparent, strobe ladders S—S, S—S' are intended to be used alternately and exclusively, there being a disabling means, such as a pivoting shutter PS (FIGURE 2), to mask out one row of strobe slits from their associated detectors, while uncovering the other. This selection may be made by the operator, a feature which allows him to choose as a reference strobe-segment, that portion of trailing edge segment TE, which intersects either of the strobe axes A, A'. Such a selection will normally be made according to the condition of the edge segment portions, i.e. whichever portion provides a sharper, straighter reference segment with no rough, frayed portions, etc.

Illumination assembly 5 comprises a light source 51 of a wavelength selected to correspond to the response wavelength of the photo-detectors associated with ladders S—S, S—S' and G—G, and an intensity sufficient to energize them properly. A collimating means or mask 52 is provided to make the emanant light directional, so as to be incident on strobe mask 24 substantially normal thereto. This minimizes "Off-angle" incidence such as will create unwanted stray reflections from surfaces adjacent the detector cells. Such stray reflections tend to introduce light noise into the strobe signals.

A mounting base 11 may be provided to support the drive roller assembly 22, the adjacent read-head 23 and strobe-head assembly 21 in prescribed fixed relation, as well as to unitarily package the electronic circuit components associated therewith into a single, pluggable unit. Base 11 is useful, for instance, to mount printed circuit boards for electronic amplifiers. The entire processing assembly 2 so mounted may thus be made integral to be removably inserted into the transport path of a card handling device, such as the indicated card reader. Such a packaging arrangement reduces field maintenance problems, since it allows service personnel to quickly eliminate operational problems associated with these units by the simple removal of one pluggable unit 2 and the substitution of a replacement.

The strobe station portion 21 of unit 2 includes a base plate 6 on which is mounted a detector assembly housing 5 and an adjacent flange 12. Flange 12 includes a roller mount 13 for journaling the card-translating rollers of roller assembly 22. As FIGURE 2 also shows, strobe mask 24 is removably inserted between the sides of housing 5, as is the removable slitted mask 23' for read head 23. A record supporting platform 14 is mounted on base 11 to be flush with the top of masks 24 and 23 so that, with them, it provides a smooth, flat card-receiving surface.

Figure 2:
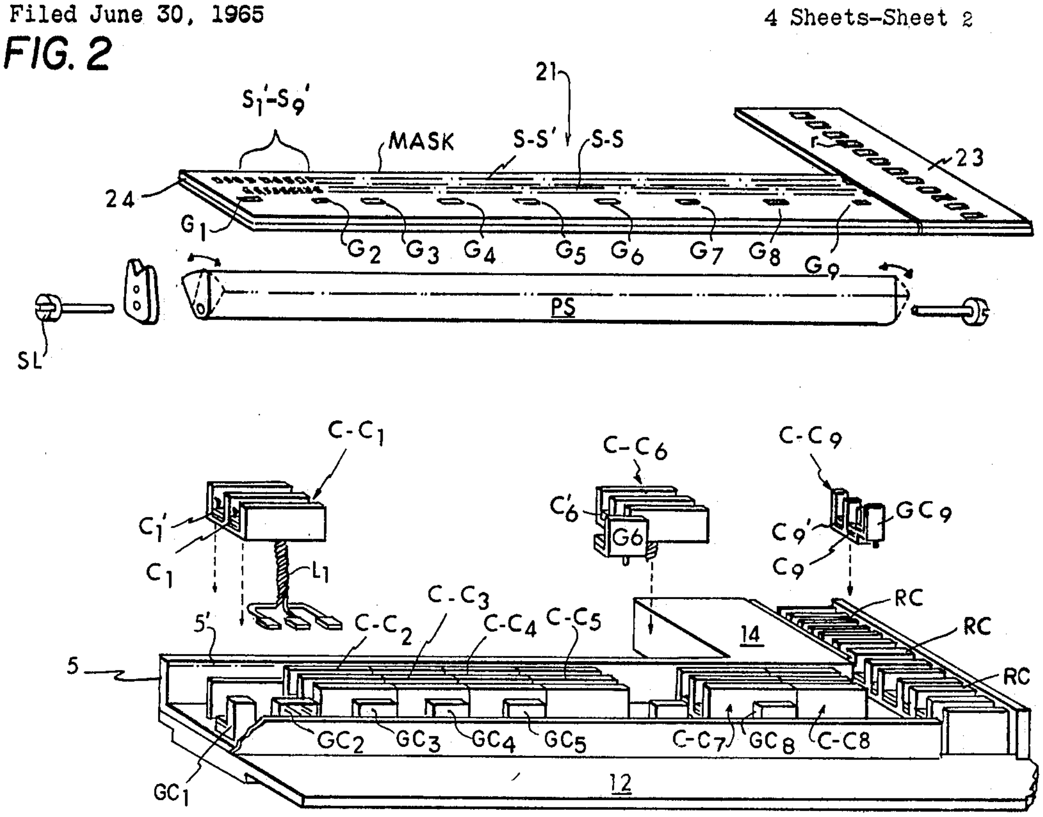
FIGURE 2 is an enlarged, exploded view of the strobe mask and associated detectors comprising the strobe station portion of the embodiment in FIGURE 1.
Figure 4:
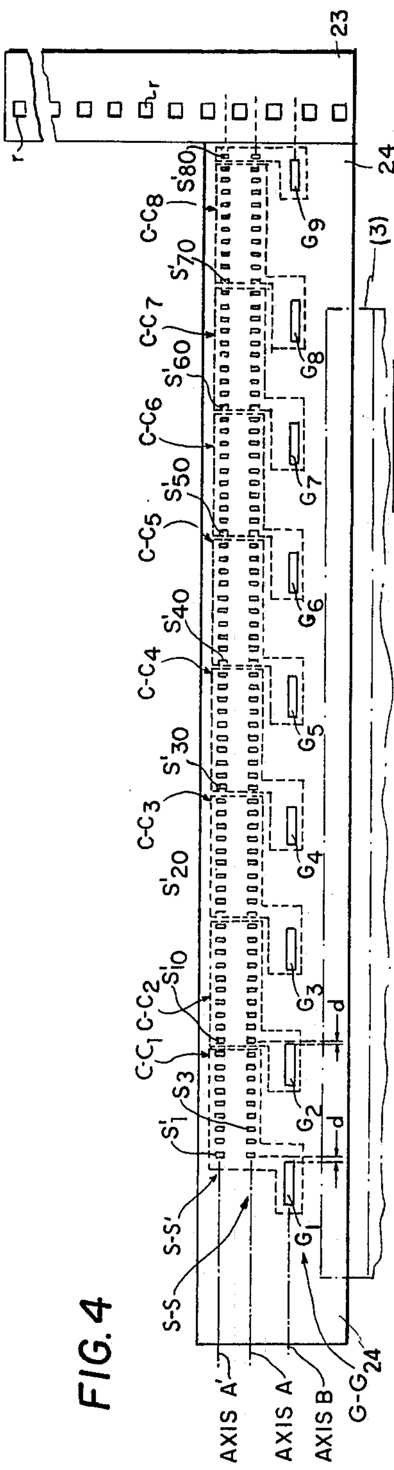
FIGURE 4 is a top-plan view of the strobe mask of FIGURE 2.

Referring to FIGURES 2 and 4, the elements of the strobe-station 21 will now be more particularly described, the strobe mask being shown in detail in FIGURE 4 (top view thereof) and in FIGURE 2, where the mask is shown in exploded relation to the photo-cells associated therewith. It will become apparent that the sensing units associated with the slits of strobe ladders S—S and S—S' may be arranged in modular blocks to be energized by a group of slits. For instance, sensor block C—$C_1$, is arranged to respond to light transmitted through slits $S_1$–$S_9$, slits $S_1'$–$S_9'$ and gate slit $G_1$. Since strobe slits $S_1$–$S_{80}$ are arranged to be spaced apart the pitch (or width) of a card column, they are adapted to direct incident light on to associated photo-detector strips C through $C_9$. Thus, the charging of strips $C_1$–$C_9$ can be adapted to indicate, incrementally, the passage of the reference trailing edge TE of a punched card across reference-positions $S_1$–$S_{80}$. Similarly, strips $C_1'$–$C_9'$ co-act with strobe slits $S_1'$–$S_{80}'$ of ladder S—S' to indicate the same along the alternate detector array.

Thus, the spacing of strobe slits $S_1$–$S_{80}$ is such as to correspond to the trailing-edge location when a given card-column comes into "read-position" at read-head 23. In certain cases, the slit and edge will not coincide exactly, however. For instance, inter-slit spacing may be varied slightly to accommodate off-normal light incidence. For example, if lamp 5 of FIGURE 1 is so constructed (e.g. point source) and positioned so that light therefrom is normally incident at the center of mask 24 (i.e. adjacent slits $S_{40}$, $S_{40}'$) the incidence angle will be slightly out-of-normal for slits spaced a distance from center (e.g. slits $S_1$ and $S_{80}$). Thus, the light incident on solar cells spaced from the center of mask 24 will be slightly oblique, increasingly so as the distance from $S_{40}$ increases. Thus, an associated detector strip may be somewhat masked out by the depth of the cell below top of mask 24 and (for approaching cards along slits $S_1$–$S_{39}$) by the thickness of the card also. To compensate for this, slits $S_1$–$S_{20}$ may be offset by slight varying amounts from the inter-column spacing normally followed (e.g. gradually from about .005" to about .0005" off-center, away from $S_{40}$).

The light from lamp 51 is kept below a intensity which will saturate the photo-detectors, of course.

It will be evident that the strobe slits $S_1$, $S'_1$ etc. may each assume any convenient cross-sectional size within an area defined by the width of a card column and the height of the "un-punchable" gap strips between card rows. This size is preferably as small as possible to provide a sharp timing signal, being sufficiently large, however, to provide a signal of suitable amplitude. It has been found, for instance, that dimensions of 0.050" wide by 0.020" long (length along axes A, A') are suitable for this purpose with the illustrated embodiment. The row G—G of gating slits comprises an array of nine identical slits $G_1$–$G_9$, aligned along axis B to be parallel with strobe rows S—S, S—S'. Each gate slit is loacted in prescribed spaced relation to an associated group of strobe slits (e.g. slit G1 with slits $S_{14}S_9$ and $S'_1$–$S'_9$) as seen below. Each gating slit G1 etc. comprises a translucent "window" through opaque mask 24 and with this embodiment may be about 0.050" wide by about 0.300" (±.005") long. The width of gate slits G1 etc. must be sufficient to fit between rows of punched holes, as with strobe slits S1 etc., while its length should be large enough to generate a sufficiently strong gating signal at the photo-detector therefor.

Additionally, each gate slit must be spaced from its associated strobe slits a critical distance "*d*" (FIGURE 4)

along axis B, distance $d$ being longer than the widest anticipated card-score or other non-informational perforation. This spacing relation allows the gating photocells associated with slits $G_1$ to $G_9$ to discriminate trailing card edges TE from such perforations, as seen below, by emitting a strobe-gating signal only while uncovered, space "$d$" being such that the trailing edge of a score will have recovered the gate slit (e.g. $G_1$) when the score exposes the first associated strobe slit (e.g. $S_1$). Thus, this "maximum-perforation" distance "$d$" will separate gate slit $G_1$ from slit $S_1$ (or $S'_1$), the first in-line of its associated strobe slits $S_1$–$S_9$ ($S'_1$–$S'_9$). Similarly, as FIGURE 4 shows, distance "$d$" separates associated slits $G_2$ and $S_{10}$ (or $S'_{10}$), $G_3$ and $S_{20}$ (or $S'_{20}$), $G_4$ and $S_{30}$ (or $S'_{30}$), $G_5$ and $S_{40}$ (or $S'_{40}$), $G_6$ and $S_{50}$ (or $S'_{50}$), $G_7$ and $S_{60}$ (or $S'_{60}$) $G_8$ and $S_{70}$ (or $S'_{70}$) and $G_9$ and $S_{80}$ (or $S'_{80}$).

According to another feature of the invention, the width of the gate slit may itself discriminate against accidental perforation-strobing. For example, a pair of such holes (e.g. staple holes) might be accidentally spaced to simultaneously "uncover" gate slit $G_1$ and one or more of strobe slits $S_1$–$S_9$. This could generate an erroneous strobe pulse. However, if the gating detectors are designed to require a greater "threshold" amount of light corresponding to the uncovering of a prescribed increased amount of "gate-slit area," such an error could not occur, since the width of the staple holes would be insufficient. For example, if the gate slits were made twice as long as the longest (along axis B) likely score or hole, and the gating detectors designed to "fire" only after over half the length of such slots were uncovered, holes shorter than this length (such as the above staple holes) could not gate the stroke cells, whereas passage of a trailing card-edge could.

Thus, it will be seen that a gating arrangement is provided according to the invention whereby light "accidentally" transmitted through stroke slits ($S_1$–$S_{80}$, $S'_1$–$S'_{80}$) may be ignored, a group of strobe slits (e.g. $S_1$–$S_9$) being "disabled" for strobing until its associated gate slit (e.g. $G_1$) detects a card's trailing-edge. Thus, the strobe slits are sequenced, or enabled in order, gate slit $G_1$ enabling strobe slits $S_1$–$S_9$ (or alternate slits $S'_1$–$S'_9$). Similarly gate slit $G_2$ enables strobe slits $S_{10}$–$S_{19}$ (or $S'_{10}$–$S'_{19}$); $G_3$ enables $S_{20}$–$S_{29}$ (or $S'_{20}$–$S'_{29}$); $G_4$ enables $S_{30}$–$S_{39}$ (or $S'_{30}$–$S'_{39}$); $G_5$ enables $S_{40}$–$S_{49}$ (or $S'_{40}$–$S'_{49}$); $G_6$ enables $S_{50}$–$S_{59}$ (or $S'_{50}$–$S'_{59}$); $G_7$ enables $S_{60}$–$S_{69}$ (or $S'_{60}$–$S'_{69}$); $G_8$ enables $S_{70}$–$S_{79}$ (or $S'_{70}$–$S'_{79}$); and $G_9$ enables $S_{80}$ (or $S'_{80}$).

Read head 23 may also inclure a removable glass slide, or mask portion 23, which, like mask 24, is constructed to be light-opaque except for read apertures, or slits, $r$. Twelve read slits $r$ are shown, one for each card-row, each slit $r$ being in optical registry with one of twelve associated photo-detectors RC (FIGURE 2). Strobe mask 24 may take the form of a removable glass plate covered with an opaque coating interrupted only by the relatively transparent apertures or slits comprising strobe ladders S—S, S—S' and gating ladder G—G. As noted, these slits are arranged in carefully defined spaced relation with the reading slits $r$ of Read head 23 so as to be in precise relation with the prescribed columns and rows in a punched card. Thus, when mask 24 is inserted along the grooves 5' in the sides of housing 5, slit arrays G—G, S—S and S—S' will be located so as to fall between rows of punched hole information when punched cards, 1, 1' are aligned along guide rail 3. Thus, slits S, S' will locate the trailing edge of an 80-hole punched card when column 1 thereof passes across read slits $r$; similarly, slits $S_2$, $S_2'$ locate column 2, and so on, through slits $S_{80}$, $S_{80}'$ for column 80.

The light normally incident on mask 24 is arranged to be directed through each of the stroke slits $S_1$–$S_{80}$ in the first strobe row S—S so as to energize the one of the associated photo-detector means $C_1$–$C_9$ which is in optical registry therewith. Thus, a first group of solar cell detectors $C_1$ through $C_9$ are aligned along strobe slit row S—S in housing 5 while a second group of cells $C_1'$–$C_9'$ are similarly aligned along parallel slit row S—S'. While a single photo-detector might have been provided for each strobe slit, it has been found preferable to form each of these solar cells into a strip of prescribed length and arrange this strip to be charged sequentially by a plurality of strobe slits. More particularly, by selecting these strips to comprise a certain material (indicated below) it has been found that sequential increments of radiation from a group of strobe slits can be made to energize a common solar cell strip in relatively equal increments to thereby generate increasing output voltages, stepwise, having relatively equal increments. This incrementally-responsive (stepped) cell output may thus indicate passage of a trailing card-edge over this group of slits, successively exposing them to light.

A feature of the invention is that up to about ten slits can be grouped to energize an individual solar cell although the first and last cells, $C_1$ and $C_9$, are shown as energized only by 9 slits and 1 slit, respectively for other reasons as noted below. It has been found that this grouping is efficient in that it requires less than eighty cells (i.e. one for each slit) and less output amplifiers, and thus conserves space and costs, while still able to emit 80 strobe pulses, as explained below. However, it was found undesirable to group substantially more than 10 slits with each solar cell since this gives poor control over cell output and strobing accuracy during accidental perforation transition. Thus, it is preferred to group about ten apertures to energize a single strobe cell, substantially less than this number being somewhat expensive to make and control and substantially more than this number resulting in deterioration of accuracy.

It will be noted, as shown in FIGURE 2, that associated strobe cells and gate cells such as solar cells or strips $C_1$, $C'_1$ and $GC_1$ may be packaged together into unitary detector modules, such as C—$C_1$, and made unitarily insertable for convenient fabrication and maintenance. Such a packaging of associated strobe and gate cells also pre-positions detectors conveniently. Cell leads may be wound securely together also as indicated at $L_1$, etc. A shutter means PS, shown as pivotably operative by screw lever SL, is provided to allow for the optical selection of either of the alternate strobe-slit rows, S—S, S—S'. Thus, the operator may rotate screw head SL to rotate a shaft attached thereto and journaled in housing 5, in turn, to pivot a shutter bar PS. Bar PS is arranged to mask either of slit rows S—S, S—S' from its associated photocell array, $C_1$–$C_9$ or $C'_1$–$C'_9$ respectively, leaving the other row uncovered and operative. Thus, an operator may examine the trailing edge of the punched card 1, and select a strobe row corresponding to the most suitable strobe-referencing trailing edge segment thereof.

As indicated, each modular grouping of strobe slits, e.g. $S_1$–$S_9$, $S'_{10}$–$S'_{19}$, etc. is arranged to direct incident light upon an associated one of solar cell strips $C_1$ ($C'_1$) through $C_9$ ($C'_9$), mounted within light-tight housing 5 in an "optical-well" arrangement. Thus, solar strip $C_1$ is energized by slits $S_1$–$S_9$, different portions thereof being in optical registry therewith. A similar relation exists between strip $C_2$ and slits $S_{10}$–$S_{19}$, cell $C_3$ and slits $S_{20}$–$S_{29}$, cell $C_4$ and slits $S_{30}$–$S_{39}$, cell $C_5$ and slits $S_{40}$–$S_{49}$, cell $C_6$ and slits $C_{50}$–$C_{59}$, cell $C_7$ and slits $C_{60}$–$C_{69}$, cell $C_8$ and slits $S_{70}$–$S_{79}$ and cell $C_9$ and "last-hole" slit $S_{80}$. Solar cell strips $C'_1$–$C'_9$ are identically energized by strobe slits $S'_1$–$S'_{80}$. Gate slits $G_1$–$G_9$ each energize a like associated solar cell strip, $GC_1$–$GC_9$ respectively. With the instant embodiment, it has been found that photovoltaic, "N on P" type of solar cell strips, about 0.10" wide, were satisfactory for operation; the "strobe strips" being about 0.850" long and the "gate strips" being about 0.300" long. Silicon type cell strips are preferred but equivalent material may be used having sufficient recovery speed, saturation and low impedance input characteristics. Silicon is also preferable in that it may be incrementally energized along the strip length to exhibit stepped output levels that are all perceptible (staircase effect, noted below) over about a ten-strobe-slit strip length. The speed and step increments of cadmium sulfide and selenium material have been found less satisfactory, however.

It will be apparent that the photo-detecting cells, besides being arranged to be optically isolated from each other in a light-tight "optical well" must preferably be spaced vertically below masking plate 24, a prescribed minimum distance. The cell strips will thus be rendered relatively insensitive to stray illumination, i.e. light other than that passing normally through the slits $S_1$, $G_1$, etc. as they are uncovered by the trailing edge of a document. More particularly, it has been found in the use of standard punched card stock, that this paper is itself somewhat translucent under normal strobe light intensities, so as to transmit light to the cells unless they are spaced sufficiently below the card. This applies especially to oily cards which can commonly be found in industrial environments, such as meat or fish packing etc. In such cases, the slits $S_1$, etc. can constitute a weak source of diffused light, even when covered by the card stock due to inherent optical properties of the paper. However, spacing the cell strips $C_1$, $GC_1$ etc. below mask 24 on the order of at least about one-half inch has been found to sufficiently reduce the intensity of card-transmitted light as to make it insignificant. Workers in the art will recognize that the above describes a novel, advantageous strobing arrangement, essentially comprising a plurality of strobe detector means together with an apertured mask means for generating detector output signals representing successive incremental positions assumed by a passing superposed document, this document being driven through an adjacent reading station for instance. Additionally, where accidental "strobe indications" are of concern, it is preferred to include gating apertures and associated gating photo-detectors to "enable" the strobe detector means only at meaningful times. While the operation of this arrangement is indicated above, it say be helpful to summarize it as follows. Assume that shutter PS is covering detector array S—S′ thus disabling cells $C'_1$–$C'_9$. Referring especially to FIGURES 1 and 4, assume that punched card 1 is being advanced across strobe station 21 toward read station 23 and that the trailing edge (TE) thereof has just uncovered initial gate slit $G_1$, as shown in FIGURE 4. At this time all of the selected strobe detector cells $C_1$–$C_9$ will have been disabled (for instance by reset means, see below); initial detector strip $C_1$ (for slits $S_1$–$S_9$) becoming enabled as soon as cell $GC_1$ has been fully charged by passage of reference edge TE so as to expose slit $G_1$ to sufficient incident light. Slits $S_1$–$S_9$ will next be exposed to light, successively, as card 1 is driven therepast and will incrementally charge strip $C_1$ to generate a stepped output voltage signal therefrom. This output may be applied to successively gate the receipt into Memory of Read-signals from read station 23 in a manner which can identify the associated card-column (columns 1–9) thereof. As long as gate cell $GC_1$ remains energized, this strobe detector output will be transmitted. As edge TE of card 1 approaches the end of this first strobe array ($S_1$–$S_9$), it will uncover the next in line of the gating slits ($G_2$) and activate its associated detector $GC_2$ so that when edge TE thereafter uncovers the first slit ($S_{10}$) in the succeeding strobe array ($S_{10}$–$S_{19}$) the detector strip ($C_2$) associated therewith will likewise have been "enabled" to transmit its strobe output signals. Thus, strip $C_2$ will emit signals identifying the passage of card columns 10–19 at times corresponding to the exposure of slits $S_{10}$–$S_{19}$, respectively, by reference edge TE. In this manner, following strobe arrays will be successively gated by their associated gating detectors and thereafter emit column-referencing (tracking) signals ending with column 80 (slit $S_{80}$). As indicated, the strobe slit $S_{80}$ corresponding to column 80 is, preferably, arranged to have a single individual detector cell, $C_9$, and a single associated gating cell $GC_9$, for reasons explained below.

Figure 3:
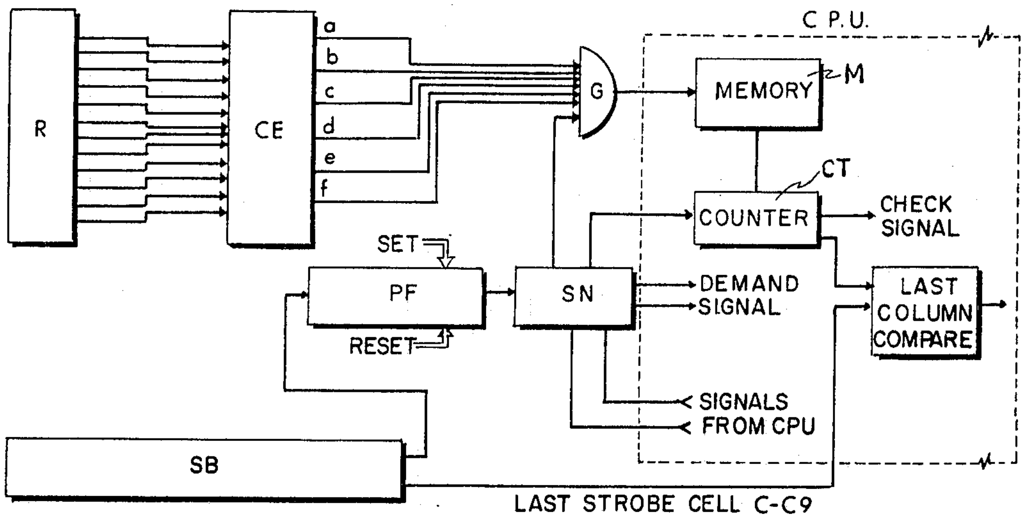
FIGURE 3 is a schematic block diagram of the electronic read-control circuit arrangement for employing signals developed by the strobe arrangement of FIGURE 1.
Figure 5:
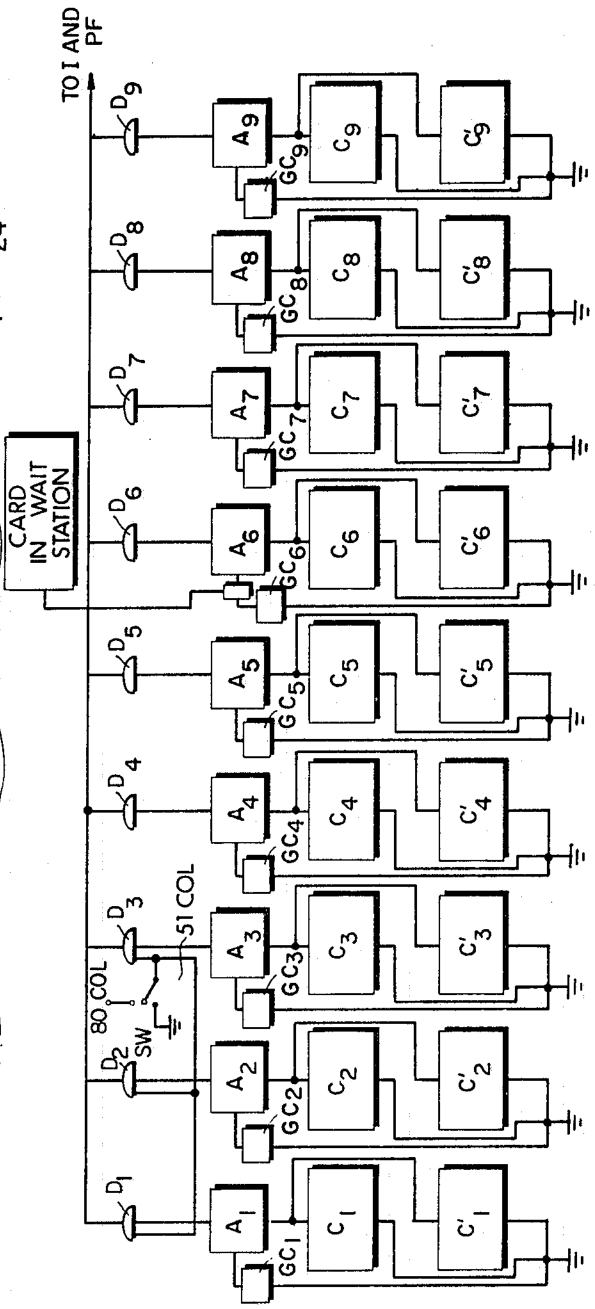
FIGURE 5 is a schematic block diagram of a circuit for developing the strobing signals employed by the circuit arrangement indicated in FIGURE 3.

As indicated above, a strobe output will be transmitted (to gate for read signals) only as long as the associated gate cell is energized. The implementation of this is explained below (re: FIGURES 3 and 5), but will be understood as providing discrimination against accidental strobe signals. For instance, if the trailing card edge TE above, had, instead, constituted an intra-card score of finite width $w$, the necessary gate output (from $GC_1$) would not be present when edge TE arrived at slits $S_1$–$S_9$, since slit $G_1$ would be positioned to be farther from its nearest associated slit ($S_1$) than this score-width $w$ and hence its detector cell $GC_1$ could not then be contemporaneously exposed therewith, but will have become covered again.

It will be apparent to those skilled in the art that the above-described elements of the strobe station 21 may take other equivalent forms within the contemplation of the invention. For instance, masking plate 24 may comprise other than coated glass. For instance, a paper plate, suitably apertured, may be used. Moreover, removable sets of different strobe masks may be provided to accommodate different card codes, that is, for differently arranged data records. The system may also be adapted for use with punched paper tape wherein "end of record" perforations are punched between data rows, these perforations (e.g. special punched patterns) being sensed by the strobe units in place of the trailing card edge, as a strobe "reference-segment." The read slits may be made round to better register with round perforations. Similarly, the strobe aperture row selection means may comprise other than the indicated pivotable shutter 8 and for instance may alternatively take the form of a different actuated shutter means, a slide or simply switching means associated with the outputs of these strobe cells C, C′ etc. The shutter and alternate detector array $C'_1$–$C'_9$ may even be dispensed wih if detectors $C_1$–$C_9$ are made translatable between slit rows S—S and S—S′. Alternate strobe slit row S—S′ may be eliminated where mask 24 is made slideable. The invention should not be limited to the use of one alternate strobe row S—S′, but may include as many of these rows as appears necessary and consonant with practicality. The shutter, or other selection means, would, of course, have to be adapted to activate only one strobe row at a time.

Another feature of the indicated multiple strobe row arrangement is that it can provide other capabilities, such as gating other data processing operations. For example, strobe row S—S′ above might be modified to have the slits $S'_1$–$S'_{80}$ thereof offset very slightly to lag associated slits $S_1$–$S_{80}$ a small distance corresponding to a Read-interval. Thus, if rows S—S, S—S′ were exposed simultaneously, the signals from slits $S_1$–$S_{80}$ could gate the read or punch head elements as before, while signals from corresponding slits $S'_1$–$S'_{80}$, lagging slightly, could initiate a Read-check or similar following operation. Such a Read-error detection system would be truly asynchronous, unlike present day checking controls which use delay means that can be upset by radical changes in card-transport speeds. The above indicated fail-safe strobe means can perform other functions. For instance, one of the gate or strobe detectors may initiate a "Read-check" whereby the detectors associated with read slits *r* may be tested periodically. A gate cell may similarly test strobe cells.

It will be apparent from the above that the general function of the strobe detector cells is to provide a gating pulse to "enable" the read-detectors at prescribed "strobe-times," corresponding to the times when prescribed data areas (hole-columns) are passing over the read head, these gating pulses being used to identify data signals according to their position on the source record. The control of this gating operation is indicated schematically in FIGURE 3, wherein the strobing signals are indicated as generated by a strobe signal bank SB and are transmitted to a read signal gate G, having been shaped by a pulse-forming stage PF and computer-synchronized by a sequential network stage SN. The read signals to be gated by these strobe signals will, of course, emanate from the read head bank R and, passing through a character encoding stage CE, will be applied in suitable computer code to gate G. As schematically indicated, the sequencing network SN functions to accept the strobing signals as they appear in column sequence and synchronize them, such as with suitable delay means, with the data storage means, namely a memory location M in the Central Processing Unit CPU of a computer. Thus the receipt of a strobe signal by the sequencing network SN will initiate "data demand" signals from the CPU, after perhaps a minor delay during which the computer prepares to receive the information from read head R.

When the CPU indicates "readiness," the sequencing network SN will transmit the strobe signal to gate G "opening" it to transmit the encoded data signals to a prescribed location in memory bank M. Sequencing network SN can also be made to control a counter means CT in the Central Processing Unit which may be provided to route the input data from gate G to a specific memory location in an ordered sequence, indicated by card column location. Counter CT is provided to perform this function in a well-known fashion and, for instance, may comprise a four-bit counter which is started by the sequencing means SN and stepped thereby upon receipt of each successive strobe pulse. The counter in turn will then route data to successive memory locations, corresponding to succesive data columns. As explained hereinafter, counter CT can also provide "last-column" check signals to the Central Processing Unit, indicating that all the columns in a unit record have been processed and more particularly indicating that the last-column has been read. For instance, means may be provided to compare a terminal count output from CT with the output from the "last hole" strobe means (slit $S_{80}$), a mismatch indicating an ERROR, either in counting or in strobing.

The strobe signals from SB are processed by pulse-forming stage PF to assure that they are presented to the sequencing network SN in the proper form, for instance, with a sufficient period to ensure contemporaneity with the corresponding read signals at gate G. It has been found that a single shot multivibrator SS with a delay of about 3–12 microseconds and a period of about 10 microseconds is suitable for this, together with a suitable inverter stage preceding it. Of course, other equivalent pulse-forming delay means known to those skilled in the art may be substituted as long as their operation time falls well within the inter-column strobing cycle, characteristically about 500 $\mu$s. At punched card processing speeds of about 800 cards per minute. Where preferred, the strobe system may be provided with a "reset" control arrangement. For instance, as indicated schematically in FIGURE 3, stage PF may be provided with reset control means comprising reset signal means and set signal means, to disable and then enable multivibrator SS, respectively during the interval between passage of successive cards past read station 23. A suitable "reset" signal may be provided by last-column detector $C_9$ ($C'_9$) indicating approach of an inter-card gap; while one of the read cells $r$ can provide a suitable "set" signal upon detection of (covered by) the leading edge of the following card.

Figure 6:
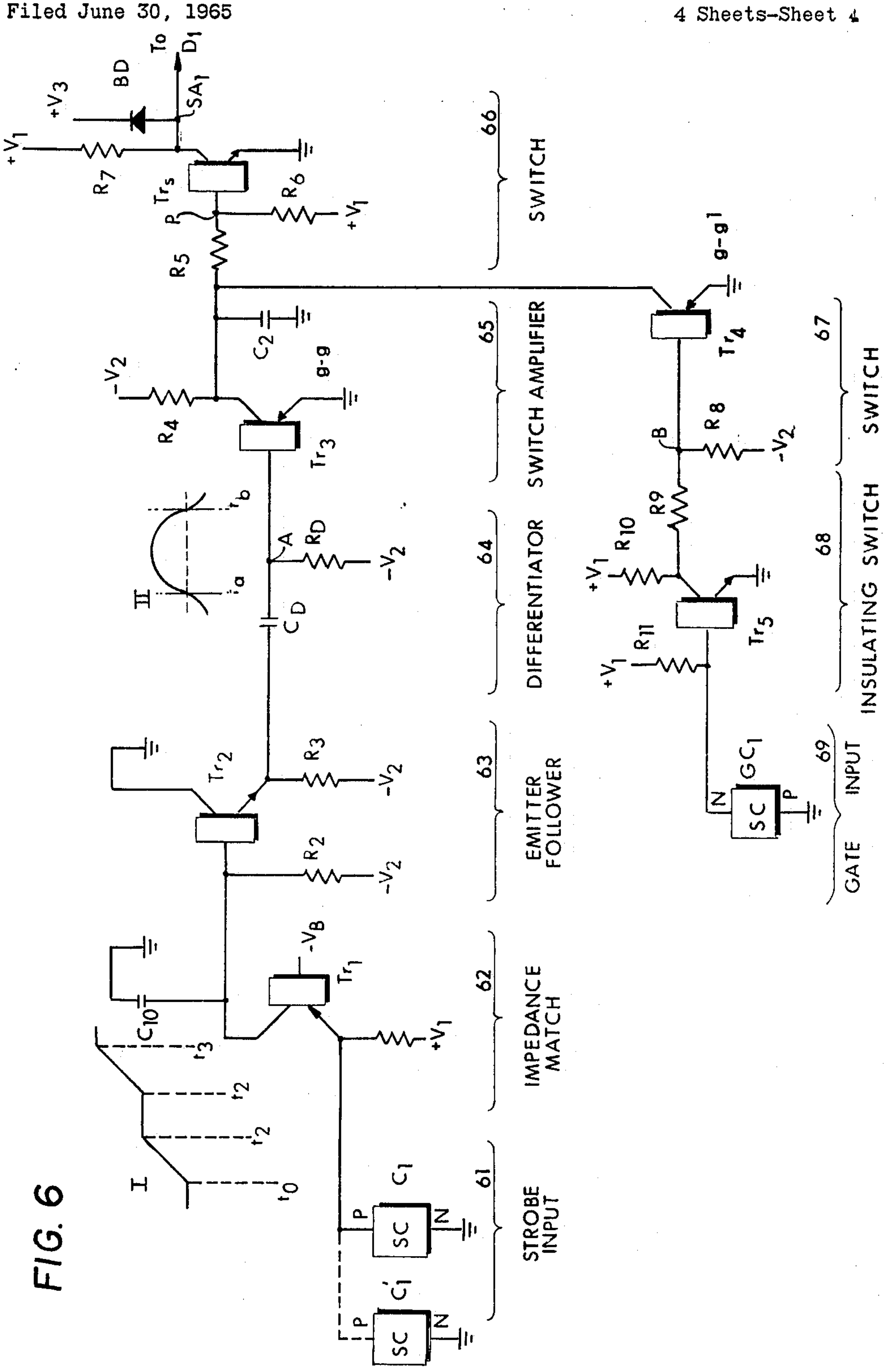
FIGURE 6 is a schematic circuit diagram of a strobe amplifier portion of the arrangement in FIGURE 5.

The strobe signal bank SB itself is more particularly indicated in FIGURE 5 wherein the electrical relation between strobe cell-gate cell modules, such as $C_1$, $C_1'$–$GC_1$, for instance, is schematically indicated, each module being associated with its own strobing amplifier gate means $A_1$ etc. to derive ordered sequential outputs therefrom. FIGURES 2 and 4 schematically indicate the physical packaging of associated strobe-gate cells. Strobing amplifiers $A_1$ through $A_9$, the circuitry of which is more particularly indicated in FIGURE 6, are thus arranged to gate the output of successive pulses from different associated strobe cells. Thus, the output from detector cell $C_1$ (or its alternate $C'_1$) cannot proceed through gate $A_1$ to stage PF, unless $A_1$ is contemporaneously impressed with a gating signal from the associated gate cell (alert cell) $GC_1$. Therefore, as indicated before, the energization of the gate cell $GC_1$ must coincide with that of strobe cell $C_1$ (or $C'_1$) to provide "score-discrimination" and produce a strobe-pulse output from $A_1$. Thus, strobe cells may be "accidentally" energized by passage of a card-score prior to passage of the trailing edge, but unless this score is wide enough to maintain gate cell $GC_1$ "ON" (e.g. until $S_1$ is uncovered—$G_1$ being spaced sufficiently from $S_1$ to prevent this!), no strobe output will emanate from gate $A_1$. Consequently, strobe pulses will emanate from gates $A_1$ through $A_9$ in order as their associated slits $S_1$–$S_{80}$ are successively uncovered by the trailing card edge.

Thus, a feature of the invention is that strobing pulses may be generated by an arrangement for turning photodetectors "ON" by the passage of the trailing-edge of a punched card or other "end-of-record" indicia such as special markings, special perforations and the like located at inter-record positions along card, tape or other record media. A related feature is that this "end-of-record" aperture may be distinguished from other apertures by gating detector, or alerting, means for "enabling" the strobe detectors.

According to a different feature of the invention strobe detection is accomplished more efficiently by arranging a plurality of strobe apertures to energize a single phototransducer. Thus, as explained in connection with FIGURE 6, a single solar cell (e.g. $C_1$) may be made to emit successive strobe signals reflecting the incidence of light thereon from its associated slits (e.g. nine signal steps from $C_1$ associated with slits $S_1$–$S_9$). Thus, amplifier $A_1$ will successively emit nine strobing pulses, one pulse for each of the nine slits associated with its strobe cell $C_1$ (or $C'_1$), while amplifiers $A_2$ through $A_8$ may similarly emit ten successive pulses in accordance with the uncovering of the ten slits associated with their strobe cells. Similarly, the final amplifier stage in order, $A_9$, may emit one pulse when the last strobe aperture $S_{80}$ ($S'_{80}$) causes the associated strobe cell $C_9$ ($C'_9$) to be energized, thus indicating the appearance of the last card-column; for instance, the 51st column or the 80th column of the card. This arrangement of slit $S_{80}$ ($S'_{80}$) with detector $C_9$ ($C'_9$) advantageously provides check signals for checking "last-column read" and column count, as indicated in FIGURE 3.

Another feature of the invention is that the indicated grouping of strobe gate cell modules facilitate conversion from the 80-column to the 51-column card-mode very simply. Such is done by merely disconnecting the first three amplifier groups, $A_1$, $A_2$, $A_3$, with switch SW, thus subtracting 29 slits from the total 80, leaving 51. "Fifty-one column" cards have found wide application in data collection situations, such as in gasoline credit card sales, because of lower cost and handling ease resulting from smaller size. It will be noted that the output pulses from amplifiers $A_1$ through $A_9$ are all presented in common to pulse-forming means PF (FIGURE 3) and may be each applied thereto through an associated isolation (diode) gating means, $D_1$ through $D_9$ respectively, as known in the art.

It will be appreciated that another feature of the invention is that, since the described strobing arrangement indicates "Read-times" by turning strobe detector means "ON," rather than "OFF," that these detectors may thereafter be kept continually "ON" and thus made "FAIL-SAFE" against accidental strobing. These "ON" detectors are also available for other functions during "record-transit" time. For instance, a detector, such as gate cell $GC_6$, may be interrogated during non-strobe times to indicate the presence or absence of a card thereon for jam-checking purposes and the like at a wait-station in a data processing machine.

FIGURE 6 indicates a particular circuit embodiment of the gating strobe amplifiers $A_1$–$A_9$ indicated in FIGURE 5. This gating circuit functions to accept successive output signals from an associated solar strobe cell (e.g. $C_1$ for gate $A_1$), representing the incidence of light from any associated slit (e.g. $S_1$–$S_9$) and to generate a responsive output strobe pulse given a simultaneously impressed input from its associated gating cell (e.g. $GC_1$). Stated otherwise, switching output stage 66 will generate a prescribed strobe pulse each time strobe input stage 61 produces a current pulse, as long as gate input stage 69 is simultaneously energized ("ON"). The above functional description will be better understood by considering the following explanation of this gating amplifier circuit.

Impedance matching stage 62 provides a low-to-high impedance match between solar cell 61 and emitter follower stage 63, plus some power gain. Associated capacitor $C_{10}$ functions as a band pass limiting (noise filtering) means to filter noise signals out while passing slit-uncovering signals. Emitter follower stage 63 functions to provide current gain, as well as high-to-low impedance matching for the following differentiating stage 64. Differentiating stage 64, comprising capacitor $C_d$ and resistor $R_d$, will modulate input signals in a well-known manner, providing one output pulse (see Curve II) on the base of transistor $Tr_3$ for each unit increment (step-function) of output current emanating from solar cell $C_1$. This output of differentiating (or peak detecting) stage 64 is applied to switching amplifier stage 65 to provide current gain as well as voltage isolation for the following stages, capacitor $C_2$ functioning as a band pass and noise filter means in a known manner. Positive-going output pulses from differentiator 64 applied to the base of switching transistor $Tr_3$ (normally-ON), will tend to switch it "OFF," thus isolating reference point P from ground terminal *g—g*.

Reference point P is thus normally grounded by connection with terminal *g—g* and is further normally grounded to terminal *g—g'* through transistor $Tr_4$, normally "ON." Light energization of gating cell GC, however, is intended to interrupt this grounding connection with terminal *g—g'* by turning transistor $Tr_4$ "OFF." Thus, energization of gate cell $GC_1$ will provide a negative-going signal at the base of "normally-ON" transistor $Tr_5$ to switch it off. This, in turn, will provide the necessary "turn-off" (positive-going) signals at the base of transistor $Tr_4$. Thus, concurrence of energization of gate cell $GC_1$ and strobe cell $C_1$ can isolate reference point P from ground and, in turn, generate a strobe pulse by switching output stage 66. Functionally, the isolation of reference point P from ground produces a negative-going bias at the base of switching transistor $Tr_s$ to de-energize it and thus isolate output terminal $Sa_1$ from ground. This allows a positive-going strobe output pulse to be generated at terminal $SA_1$ and applied thereafter to stage PF, this pulse being clamped at a $+V_3$ volt level by diode BD. It will be apparent that gate cell $GC_1$ will remain energized for the entire "card-read" cycle, once the trailing card-edge has uncovered it, thus keeping point P isolated from grounding connection *g—g'*. However, the output from strobing solar cell $C_1$ will comprise intermittent rising current levels (steps—as in Curve I) and serve to isolate point P from ground terminal *g—g* only during nine (for $A_1$, ten for $A_2$–$A_8$) intermittent periods of prescribed duration. This will cause nine successive output pulses at terminal $SA_1$, the leading-edge of which will reflect the passage of the reference segment (i.e. the trailing card-edge) across one of the slits $S_1$–$S_9$. It will be apparent that the initiation of this output pulse at $SA_1$ can be delayed somewhat according to the slope of the energization Curve I of cell $C_1$, since this characteristic will determine the slope of the differentiated output pulse (II) from stage 64 as well as the level thereof. Output pulse II will, in turn, determine the "OFF-period" of transistors $Tr_3$ and $Tr_s$, these periods corresponding to the time pulse II remains above a reference minimum switching level (*tb—ta*).

Thus, the slope and magnitude of the pulses from strobe cell $C_1$ can determine the starting time and the duration of the strobe amplifier output pulses at $SA_1$, these values being a function of the rate of rise in incident light level through the strobe slits (e.g. $S_1$–$S_9$). Pulse duration (at $SA_1$) is not critical so long as it is sufficient to trigger the pulse-forming stage PF (i.e. multivibrator SS). Pulse starting time is somewhat critical, however, since too early or too late an output at Read gate G will be unable to coincide with arriving data signals and gate them through G into memory. Some tolerance in non-coincidence is achieved by arranging the strobe system to generate gating pulses at the mid-point of prescribed column areas so that Read signals or strobe signals which are slightly early or late can still allow coincidence of data and strobe signals at Gate G. Thus, it is evidently important to maintain a relatively constant rise in strobe cell output current in order to maintain a constant minimum delay in the gating pulse emanating from pulse-forming stage PF. It has been found that strobe output may be kept thus constant by maintaining a low impedance load at the output of cell $C_1$. Thus, it is a feature of the invention that stage 62 is designed to present a low impedance load for cell $C_1$. While the gating amplifier circuit of FIGURE 6 was described only with reference to amplifier $A_1$ (i.e. for strobe cells $C_1$ ($C'_1$) and associated gate cell $GC_1$), it is also characteristic of the other amplifiers $A_2$–$A_9$. Thus, cards must be transported fast enough past slits $S_1$–$S_{80}$ so that the change in light therethrough does not occur so slowly as to produce an inadequate differentiated signal at stage 64. Hence, the transport system must not be run below a minimum speed, although this speed can vary from slit to slit or from time to time, at speeds above this minimum level. Minimum speeds of about 100 in./sec. have been found adequate with the above embodiment. The above-described gating circuit for generating strobing pulses according to the invention is exemplary only and those skilled in the art will appreciate that other and different arrangements may be substituted. For instance, the signals from the strobe cell array may control other data processing sub-units such as transport systems, punch mechanisms, printers and the like alone or together with the read station control above described.

The principles of the invention may be implemented in a number of different ways. The strobing system may be modified to strobe from a different card Zone or to strobe in a somewhat different fashion using modified elements of the invention. For instance, the system may be used to strobe from the long edges of a punched card, i.e. the "12" or "9" edges, in broadside fashion (row-by-row as opposed to column-by-column). Workers in the art will also visualize that the invention can be applied with continuous records (e.g. tape) rather than the discontinuous unit records such as the punched cards, described above. However, different reference segments might be provided for different media, for example, a transverse row of reference marks (e.g. punched holes) may be provided at the end of specified fields along a continuous paper tape. In such a case, it will be understood that the gating cells will be modified accordingly to discriminate between "end of record" reference marks and similar-looking "accidental" marks, such as by distinguishing according to "mark-widths" as indicated in the described embodiment.

It will be apparent to those skilled in the art that unlike many prior art strobing systems, the system according to the invention is "fail-safe." That is, being turned "ON" rather than "OFF," the strobing detectors are not prone to give an accidental or erroneous read-out because of "non-signal" conditions, as are the "turned-off" systems, wherein particles of dust which can cover apertures and failure of the equipment (such as amplifiers, power supplies, etc.) can give an erroneous "OFF" indication.

While in accordance with the provisions of the patent law, the above has illustrated and described the best form of the invention, and its mode of operation, it will be apparent to those skilled in the art that changes may be made in the apparatus described without departing from the spirit and scope of the invention as set forth in the appended claims, and that in some cases, certain features of the invention may be used to advantage without a corresponding use of other features and certain features may be changed or substituted for equivalently in ways appreciated by those skilled in the art.

Having now described the invention, what is claimed as new and desired to be secured by Letters Patent, is:

1. A strobing system for identifying the movement of data columns on unit records along a path relative to a reference station by detecting the movement of a reference segment on said records relative to said station, said system comprising:

a plurality of tracking pulse generating means for emitting pulses in response to the transition of said reference segment thereacross; said tracking pulse generating means being aligned along said path and spaced relative said station so as to indicate equal increments of said transition; and a plurality of alert pulse generating means for emitting pulses in response to the transition of said reference segment thereacross, each of said alert pulse generating means being positioned so as to be traversed by said reference segment immediately before certain associated ones of said tracking pulse generating means and having more limited response characteristics so as to be substantially less sensitive than the associated tracking pulse generating means to stimuli resembling said reference segments.

2. The combination recited in claim 1 wherein said system also includes:

a plurality of ANDing gate means, each being operatively connected to the output of one of said alert pulse generating means and associated ones of said tracking pulse generating means so as to generate control pulses representing the coincident energization thereof, being adapted to apply said control pulses to said station.

3. A record-synchronized timing station for controlling apparatus for the processing of record media having informational areas of prescribed translucence and, further, having "end-of-record" areas of prescribed variable translucence; said station being arranged in combination with:

a record processing station, record advance means arranged to translate said media along a prescribed path relative to said station; and radiation means adapted to project radiation normally on said path; said timing station being disposed along said path in predetermined spaced relation with said processing station, upstream thereof, said timing station including an array of radiation detector means arranged along said path to be normally activated by said radiation and to be overshadowed by said record media during translation thereof along said path, said detector means further being aligned so as to be unresponsive to said informational areas as said media are advanced along said path, but to be responsive to said end-of-record areas whereby ones of said informational areas may be automatically indicated as located in prescribed relation to said processing station by output pulses applied thereto; said detector means further being selectably positionable along various axes parallel to said path for detection of different selectable portions of said "end-of-record" translucent areas.

4. Apparatus for tracking columns of data marks upon a unit record as said record is moved along a path normal to said columns past a record processing station and producing a signal for controlling the processing station, said columns being spaced parallel at prescribed different distances from a reference segment on said record and the marks in each column being separated by parallel non-data bearing strip portions, said tracking apparatus comprising, an opaque masking plate for supporting said record, having at least first and second linear arrays of apertures formed therein, said apertures being aligned, respectively, along first and second tracking axes parallel to said path;

transport means for moving said record over said plate along said path;

means for maintaining said record in alignment whereby said non-data bearing strip portions lie along said tracking axes;

the apertures of said first array being spaced at predetermined different distances from said station which correspond to the distance between columns of data on said record and the apertures of said second array being spaced at different distances from said station to precede by a predetermined spacing a group of successive apertures of said first array, whereby said reference segment always traverses an aperture of said second array immediately before it traverses the associated group of apertures of said first array;

a first plurality of photo-detector means for receiving radiation transmitted through apertures of said first array;

a second plurality of photo-detector means for receiving radiation transmitted through apertures of said second array;

gate control means connecting each detector means of said second plurality with an associated group of detector means of said first plurality; and electrical control means for providing a control signal to said processing station in response to output signals received from detector means of said first plurality.

5. Apparatus as described in claim 4 further including a third linear array of apertures formed in said plate, the apertures of said third array being aligned in groups along a third tracking axis parallel to said path at predetermined distances which correspond to the distances between colums of data on said record, whereby said reference segment always traverses an aperture of said second array immediately before it traverses the associated group of apertures of said third array;

a third plurality of photo-detector means for receiving radiation transmitted through apertures of said third array;

gate control means connecting each detector means of said second plurality with an associated group of detector means of said third plurality;

circuit means connecting output signals of the detector means in said third plurality to said electrical control means; and shutter means for selectively exposing one of said first and third pluralities of detector means for exclusive energization thereof.

6. Apparatus as described in claim 4 wherein said first and second pluralities of photo-detector means comprise, respectively, first and second modules of photo-voltaic strips, the strips of said first module being adapted to be energized by a plurality of apertures of said first array, each of the strips of the second module being spaced a prescribed minimum distance upstream of an associated strip of said first module.

7. Apparatus as described in claim 6 wherein said first module comprises nine photo-voltaic strips, each said strip being arranged to be energized by ten apertures of said first array, except that the first and last strips in line are adapted to be energized by nine and one, respectively, of said apertures.

8. Apparatus as described in claim 7 operatively associated with computer means, and wherein said electrical control means comprises pulse-forming means coupled to the output of the detector means of said first plurality;
computer synchronizing means operatively connected to the output of said pulse forming means and to said computer means; and read-gating means connected to apply the output of said synchronizing means to gate the output of said processing station to introduce signals therefrom into said computer means in timed, ordered fashion.

9. A timing control system for data processing apparatus including
reading means for sensing information contained upon records advanced along a predescribed path past said reading means;
tracking means connected to said reading means for producing output timing signals proportional to the incremental progress of one of said records along said path;
said tracking means including a first timing ladder comprising a plurality of adjacent light responsive sensing elements disposed in groups along a tracking axis substantially parallel to said path to sequentially intercept the trailing edge of a record advancing along said path,
a second timing ladder comprising a plurality of light responsive gate elements spaced at selected locations along an axis parallel to said first timing ladder to sequentially intercept the trailing edge of a record advancing along said path, and
circuit means connecting the output of each of said gate elements as an enabling input to a different predetermined group of sensing elements whereby said input sensing elements are enabled immediately prior to the passage of the trailing edge of a record along said path.

10. A synchronizing system for data processing apparatus including,
a station for operating upon unit records having data storage spaces thereon;
means for successively advancing said unit records along a prescribed path past said station; and
means for detecting the progression of individual unit records along said path and producing a synchronizing signal proportional to said unit record progression for controlling said station;
said detector means comprising a plurality of N groups of sensing elements located in N respectively corresponding zones along a tracking axis to sequentially intercept at least a reference portion of each unit record moving along said path and produce said synchronizing signal;

a plurality of N gate elements corresponding, respectively, to said N groups, each said gate element being located within the zone of its corresponding group to intercept at least said reference portion of each unit record moving along said path, immediately prior to the interception of said reference portion by a sensing element of said corresponding group, and produce an output in response thereto; and
means connecting the output of each gate element as an input to the sensing elements of its corresponding group to thereby enable said sensing elements.

11. A synchronizing system as described in claim 10 which includes nine groups of sensing elements,
each said group comprising ten sensing elements, except that the first and last groups along said tracking axis comprise nine and one, respectively, sensing elements.

12. A synchronizing system as described in claim 10 wherein
each sensing element comprises a portion of a mask fixed adjacent to said path and having an aperture therein,
a light responsive cell mounted beneath said mask portion in alignment with said aperture, and
a light source mounted above said aperture.

13. A synchronizing system as described in claim 10 further including a second plurality of N groups of sensing elements located in N respectively corresponding zones along a second tracking axis to sequentially intercept at least a reference portion of each unit record moving along said path and produce said synchronizing signal;
means connecting the output of each gate element as an input to the sensing elements of its corresponding group of said second plurality to enable said sensing elements; and
shutter means for selectively screening said first and second pluralities of groups.

References Cited

UNITED STATES PATENTS

| | | | |
|---|---|---|---|
| 2,831,634 | 4/1958 | Luhn | 235—61.115 |
| 2,851,676 | 9/1958 | Woodcock et al. | |
| 3,052,405 | 9/1962 | Woodland | 235—61.115 |
| 3,143,017 | 8/1964 | Donnel. | |
| 3,153,721 | 10/1964 | Kaminski et al. | 235—61.11 |
| 3,173,000 | 3/1965 | Johnson et al. | 235—61.115 |
| 3,184,581 | 5/1965 | Willoughby | 235—61.11 |
| 3,229,073 | 1/1966 | Macker et al. | |
| 3,238,357 | 3/1966 | Minka | 235—61.115 |
| 3,341,691 | 9/1967 | Modersohn et al. | 235—61.115 |
| 3,365,568 | 1/1968 | Germen | 235—61.115 |

DARYL W. COOK, Primary Examiner

R. M. KILGORE, Assistant Examiner

U.S. Cl. X.R.

250—219